United States Patent [19]

De Vries

[11] 3,846,765

[45] Nov. 5, 1974

[54] DYNAMIC CELL SEMICONDUCTOR MEMORY WITH INTERLACE REFRESH

[75] Inventor: Robert Gale De Vries, Littleton, Colo.

[73] Assignee: Monolithic Systems Corporation, Englewood, Colo.

[22] Filed: Feb. 14, 1973

[21] Appl. No.: 332,296

[52] U.S. Cl. ..... 340/173 DR, 340/173 R, 340/172.5

[51] Int. Cl. ......................... G11c 11/40, G11c 11/24

[58] Field of Search ....... 340/173 R, 173 DR, 172.5

[56] References Cited

UNITED STATES PATENTS

| | | | |
|---|---|---|---|
| 3,731,287 | 5/1973 | Seely | 348/173 DR |
| 3,737,879 | 6/1973 | Greene | 346/173 DR |
| 3,748,651 | 7/1973 | Mesnik | 346/173 DR |
| 3,760,379 | 9/1973 | Nibby | 346/173 DR |

*Primary Examiner*—Terrell W. Fears
*Attorney, Agent, or Firm*—Sheridan, Ross & Fields

[57] ABSTRACT

A dynamic cell memory is divided into an even address module and an odd address module, each requiring periodic refreshing of the data stored therein. A refresh interlace control is provided for automatically refreshing, on each memory cycle, a portion of the data stored in the module that is not addressed for a read or write operation. The refresh interlace control also includes timing means operable to force a refresh operation for any module if a predetermined interval of time elapses during which that module is addressed on every memory cycle for either a read or a write operation.

10 Claims, 3 Drawing Figures

DYNAMIC CELL SEMICONDUCTOR MEMORY WITH INTERLACE REFRESH

PRIOR ART

The present invention relates to dynamic cell semiconductor memory systems and more particularly to memory systems employing metal oxide semiconductive field effect transistors as the memory cells. Integrated circuit memory systems of this type are well known in the art and are fully described in U.S. Pat. No. 3,599,180, and U.S. Pat. No. 3,618,053. Each memory cell is capable of storing an electrical representation of one binary bit of information. Briefly, each cell comprises a plurality of metal oxide semiconductive field effect transistors on an integrated circuit chip. The transistors may be selectively turned on and off thereby enabling a charge to be trapped in the circuit capacitance of the cell. The presence of a charge may represent a binary 1 while the absence of a charge may represent a binary 0.

Since the trapped charge tends to decay, means must be provided to restore or refresh the charge at periodic intervals. As explained in U.S. Pat. No. 3,599,180, the refresh operation may be accomplished during read or write operations provided there are a limited number of memory addresses and provided the addresses are accessed in sequence. However, if the memory includes a large number of addresses, or if the memory is operated in the random access mode, then too great an interval of time may elapse between refresh operations and the trapped charges may dissipate to such a low level that the stored data is lost. In this case the memory must be provided with means for periodically refreshing each cell, the cells being refreshed one row at a time. For a matrix of 32 rows and 32 columns, this means that 32 consecutive refresh cycles must be taken in order to refresh the trapped charge in each memory cell. During these 32 cycles the memory is not available for either a read or write operation and the data processing system to which the memory is connected must wait until all of the refresh cycles have been completed.

SUMMARY OF THE INVENTION

An object of the present invention is to provide a dynamic cell semiconductor memory system wherein a minimum amount of memory time is lost due to execution of memory refresh cycles.

An object of the present invention is to provide a memory system comprising a plurality of memory modules each including a plurality of addressable data storage locations of the type requiring refreshing, and refresh interlace control means for controlling the memory modules so that a read or write operation is performed by the module containing the addressed data storage location while refresh cycles are performed by the other module or modules.

An object of the present invention is to provide a memory system comprising a plurality of memory modules, and control means responsive to an address signal and a read or write signal for controlling one of the modules to perform a read or write operation while the other modules perform refresh cycles, the control means further including timer means for forcing a particular memory module to perform a refresh cycle if a predetermined interval of time has elapsed since that module last performed a refresh cycle.

In accordance with the present invention, a memory system comprises a plurality of memory modules each having a plurality of randomly addressable data storage locations of the type which store data signals in dynamic form as trapped electrical charges. Associated with each memory module is a memory cycle control means and a refresh interlace control circuit for selectively controlling the modules to perform a read, a write, or a refresh cycle. Addressing signals are applied to the modules to address a specific data storage location. A Read or Write signal, indicating the type of operation to be performed at the addressed data storage location, is applied to the interlace control circuits along with an address signal indicating which module contains the addressed data storage location. Each refresh interlace control circuit includes first means responsive to the address signal and a read or write signal for initiating a read or write cycle of its associated module, if the address signal indicates the addressed data storage location is in that module. Each refresh interlace control circuit includes second means responsive to the address signal and a read or write signal for initiating a refresh cycle of its associated module if the address signal indicates tha addressed data storage location is not in that module. Each refresh interlace control circuit includes a third or timer means which is triggered each time the second means initiates a refresh cycle. The timer means, after being triggered produces an asynchronous refresh request, if the timer means is not retriggered within a specified interval of time. The timer means insures that every module is refreshed at intervals at least as often as required to maintain the trapped charges at the data storage locations.

A refresh address counter in each memory module is incremented by one on each refresh cycle and the count in the counter is applied as an addressing signal so that memory locations in any one module are refreshed in sequence.

DETAILED DESCRIPTION OF THE INVENTION

OVERALL SYSTEM — FIG. 1

Figure 1:
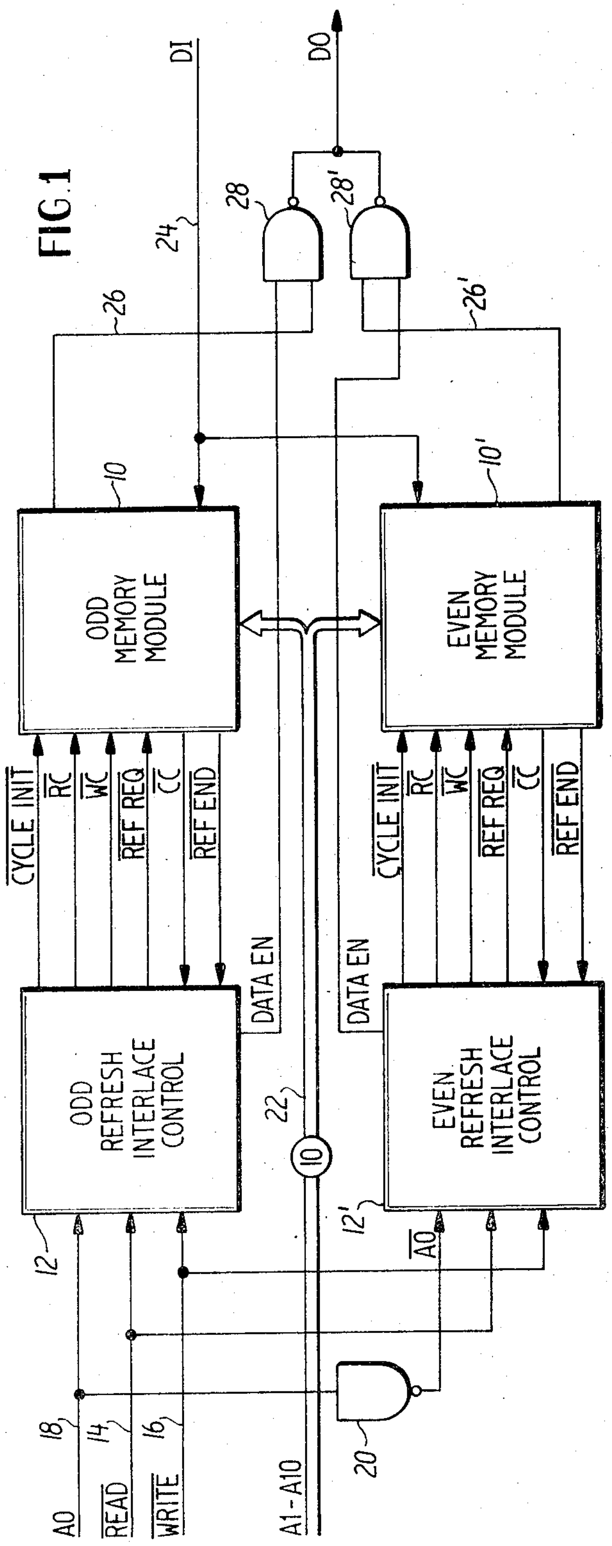
FIG. 1 is a block diagram of the invention as embodied in a system employing two memory modules.
Figure 3:
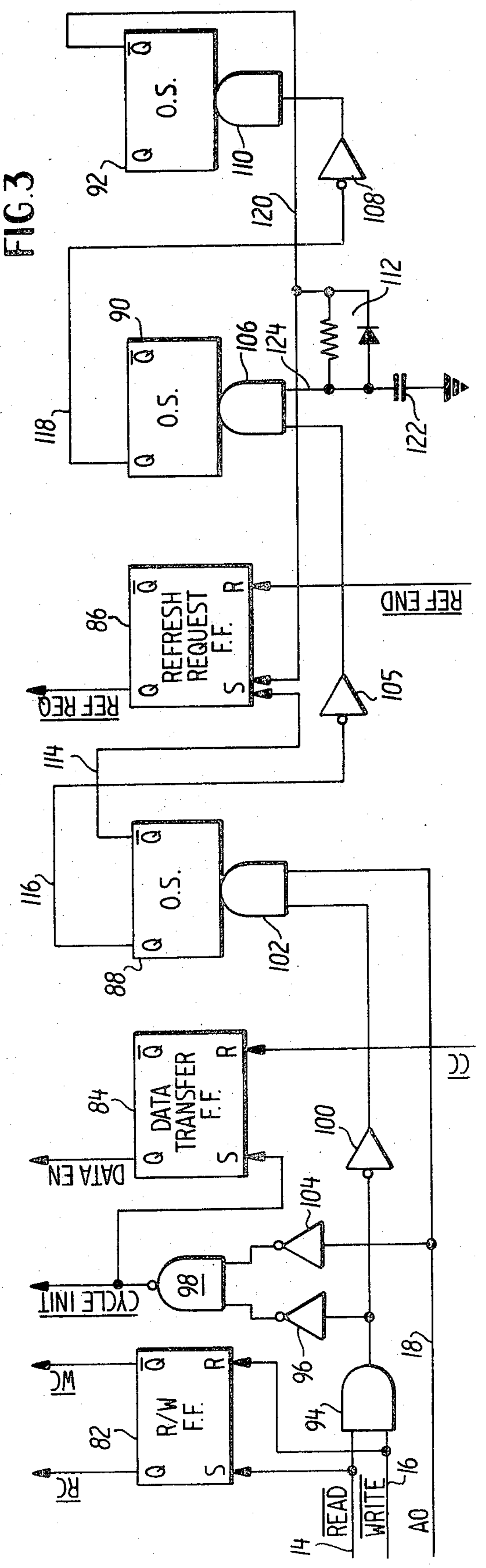
Figure 2:
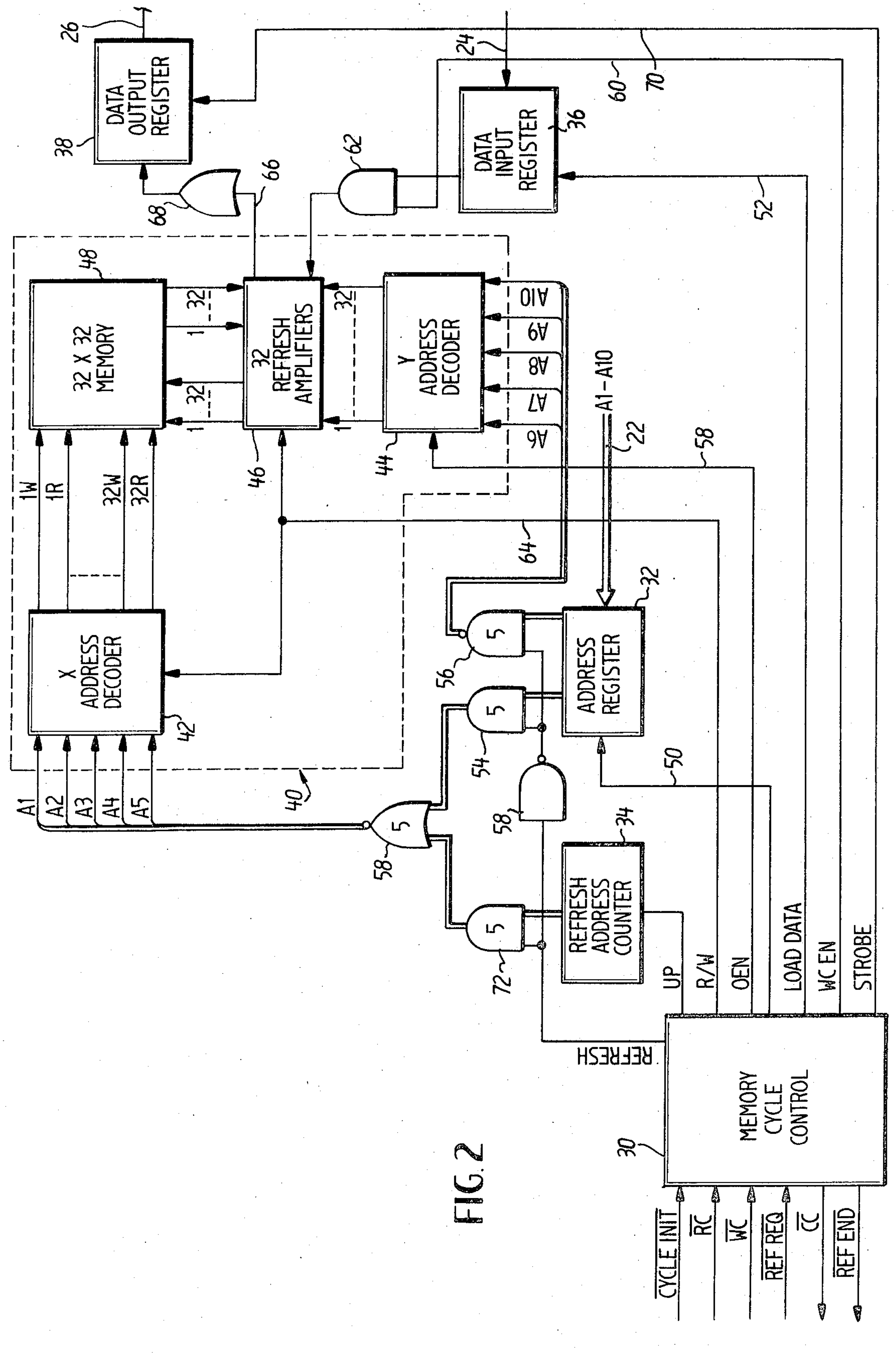
FIG. 2 illustrates a memory module suitable for use in the present invention; and, FIG. 3 is a logic diagram of a refresh interlace control circuit constructed in accordance with the present invention.

The embodiment of the invention illustrated in FIG. 1 includes an odd memory module 10, an even memory module 10', an odd refresh interlace control circuit 12 and an even refresh interlace control circuit 12'. The two memory modules 10 are identical and each module includes cycle control, addressing circuits and a storage memory with data input and output registers, as illustrated in FIG. 2. The two refresh interlace control circuits 12 are identical and each comprises a logic circuit as illustrated in FIG. 3.

Both interlace control circuits receive the commands Read and Write over leads 14 and 16. The signal A0 on lead 18 represents the low order bit of an address and this signal is applied directly to the odd refresh interlace control. The address signal A0 is also applied to a gate 20 where it is inverted before being applied to the even refresh interlace control. As subsequently explained in detail, the refresh interlace control circuits respond to the signals on leads 14, 16, and 18 to control the two memory modules so that each module performs a Read, a Write, or a Refresh cycle. If the address signal A0 indicates the address of the location in memory to be accessed is odd, then the odd refresh interlace control circuit 12 generates the signal $\overline{\text{Cycle Init}}$. In addition, it generates one of the signals $\overline{\text{RC}}$ or $\overline{\text{WC}}$ depending upon which of the commands Read or Write is present on leads 14 and 16. The signal Cycle Init in conjunction with either $\overline{\text{RC}}$ or $\overline{\text{WC}}$ causes the odd memory module to execute one read or one write cycle. The particular odd memory location accessed during this cycle is determined by the 10-bit binary address (A1–A10) applied to both memory modules over the address buss 22. If a Write operation is being performed, one data bit appearing on lead 24 is gated into the odd memory module at the location specified by the address bits A1–A10. If a Read operation is being performed, one data bit is gated out of the odd memory module onto lead 26 and applied to a gate 28. This gate is further conditioned by the signal Data En which is produced by the odd refresh interlace control circuit 12 during a Read operation involving an odd address. The data bit is thus gated onto the data output line (DO) from whence it may be applied to other circuits such as the arithmetic circuits of a data processor. At the end of the Read or Write cycle, the odd memory module produces the signal CC to reset the odd refresh interlace control circuit.

At the same time a Read or Write operation is initiated by the odd refresh interlace control circuit, the signal $\overline{\text{A0}}$ is sensed by the even refresh interlace control circuit 12' and this circuit produces the signal $\overline{\text{Ref Req}}$. The signal $\overline{\text{Ref Req}}$ is applied to the even memory module 10' where it initiates a Refresh cycle that is performed synchronously with the read or write cycle of the odd memory module. During this refresh cycle, the data stored in certain cells of the even memory module is "refreshed" by restoring the stored charges representing binary ones. As subsequently explained, the particular cells which are refreshed are determined by a refresh counter, and the count in the counter is incremented by one on each refresh cycle. At the end of the refresh cycle, the even memory module 10' produces the signal $\overline{\text{Ref End}}$ to reset the even refresh interlace control circuit 12'.

From the above description it is evident that for an odd address the odd memory module performs a Read or a Write cycle while the even memory module performs a refresh cycle in synchronism therewith. On the other hand, if A0 indicates that the memory location to be accessed is even, then the even memory module executes a Read or Write cycle while the odd memory module synchronously executes a Refresh cycle.

MEMORY MODULE — FIG. 2

For ease of explanation, it is assumed that the memory module shown in FIG. 2 is the odd memory module. However, it should be understood that the odd and even memory modules are identical. The memory module includes a memory cycle control 30, an address register 32, a modulo 32 refresh address counter 34, a data input register 36, a data output register 38, and an integrated circuit memory 40. The particular memory 40 shown in FIG. 2 corresponds to the Model S2103 random access memory produced by American Micro-Systems, Inc. It employs normally off P-channel MOS devices integrated on a 1024XI monolithic array. The integrated circuit memory 40 includes an X address decoder 42, a Y address decoder 44, 32 refresh amplifiers 46, and a bit addressable 32 × 32 array of storage cells or locations 48, allllocated on a single pluggable unit or chip.

The memory cycle control 30 may, for example, comprise a plurality of one-shot multivibrators interconnected to form a timing chain. The memory cycle control 30 responds to signals received from the odd refresh interlaced control circuit 12 to generate timing signals for either a read, a write or a refresh cycle of the memory 40. The memory cycle control responds to the signals $\overline{\text{RC}}$ and $\overline{\text{Cycle Init}}$ to generate signals necessary for carrying out a read cycle of the memory 40. It responds to the signals $\overline{\text{WC}}$ and $\overline{\text{Cycle Init}}$ to generate the signals necessary for carring out a Write operation of the memory 40, and in response to the signal Ref Req it generates the signals necessary for carrying out a refresh cycle.

At the conclusion of a read or write cycle, the memory control 30 produces a signal $\overline{\text{CC}}$ which resets the refresh interlace control circuit 12. At the end of a refresh cycle, the memory cycle control produces the signal $\overline{\text{Ref End}}$ to reset the refresh interlace control circuit.

A memory write cycle is performed as follows. The bit of data to be stored in one of the cells in array 48 is applied to the one bit data input register 36. The address of the cell into which the bit of data is to be written is applied over buss 22 to the address register 32. As subsequently explained, the command $\overline{\text{Write}}$ in combination with the low order address bit A0 indicating an odd address causes the odd refresh interlace control 12 to produce the signals WC and $\overline{\text{Cycle Init}}$. These two signals are applied to memory cycle control 30 which then generates the sequence of signals necessary to perform the Write operation. The memory cycle control generates a signal on lead 50 to gate address bits A1–A10 into the address register 32. It also generates the signal Load Data which is applied over the lead 52 to the data input register 36, thereby gating the bit of data on line 24 into the register.

The five low orders of address register 32 are applied to five gates 54 while the five high orders of the address register are applied to five gates 56. All of these gates are further conditioned by the output of an inverter 58 which receives the signal Refresh from memory cycle control 30. Since the signal Refresh is at a low level throughout a Write cycle, the output of inverter 58 conditions all of the gates 54 and 56 so that the address may pass through these gates. The address bits passing through gates 54 are applied through five NOR circuits 58 to the X address decoder 42. The address bits passing through gates 56 are applied directly to the Y address decoder 44.

The memory cycle control 30 generates the signal Chip Enable (CEN) on lead 58 and this signal is applied to the Y address decoder 44. This enables the Y address decoder to energize one of 32 output lines connected between the decoder and gating means (not shown) associated with the 32 refresh amplifiers 46. The memory cycle control 30 then produces a signal WC EN on lead 60 and this signal conditions a gate 62 so that the bit of data is gated from the register 36 to the gating means (not shown) at the input of each of the refresh amplifiers. The memory cycle control 30 then causes the signal R/W on lead 64 to drop to a low level. This signal is also applied to the gating means associated with each refresh amplifier and, in combination with the one energized output line from the Y address decoder gates the data bit through one of the refresh amplifiers. At the same time, the signal R/W is applied to the X address decoder where it acts in conjunction with the addressing signals to control one row of cells in array 48 to receive a data bit. However, since only one refresh amplifier receives the data bit it is stored in array 48 only at the single cell in the column corresponding to the refresh amplifier and the row energized from the X address decoder. Reference may be made to U.S. Pat. No. 3,599,180, particularly FIG. 7, for a more detailed showing of the cooperation between refresh amplifiers and the memory array. At the end of the Write cycle, the memory cycle control 30 produces the signal $\overline{CC}$ which is applied to the odd refresh interlace control 12 to reset the interlace control.

Still assuming that FIG. 2 represents the odd memory module, the module performs a Read cycle as follows. The odd refresh interlace control 12 applies the signals RC and Cycle Init to the memory cycle control 30 to begin the cycle. The address of the bit to be read out of the memory is applied over buss 22 to the address register 32 and the memory cycle control produces a signal on lead 50 to gate this address into the address register. The signal Refresh is at a low level during a read cycle so that inverter 58 conditions gates 54 and 56 and the address bits are applied to the X address decoder 42 and the Y address decoder 44.

Memory cycle control 30 generates the signal Chip Enable on lead 58 to condition the Y address decoder and the decoder energizes one of 32 output lines to condition the gating means associated with one of the refresh amplifiers. The signal R/W remains at a high level during a Read cycle and conditions the X address decoder so that it energizes one row of cells in array 48 for readout to the 32 refresh amplifiers 46. The signal R/W in conjunction with the single output from the Y address docoder enables the data bit to pass from one memory cell through a refresh amplifier onto the lead 66. The data bit on lead 66 is inverted at 68 and applied to the one-bit data output register 38. The memory cycle control produces the signal Strobe on lead 70 and this signal is applied to the register 38 to sample the data bit and store it in the register. Referring to FIG. 1, it is seen that the lead 26 is connected to the gate 28. This gate is further conditioned by the signal Data En from the odd refresh interlace control so that the data bit is applied through gate 28 to the data output line from whence it may be applied to arithmetic or other data processing circuits.

At the end of the Read cycle the memory cycle control 30 produces the signal $\overline{CC}$ which is applied to the odd refresh interlace control circuit 12. The signal resets the odd refresh interlace control circuit thereby terminating the Data En signal.

The odd memory module shown in FIG. 2 performs a refresh cycle anytime a Read or Write operation at an even address is performed by the even memory module. As subsequently explained, the odd refresh interlace control responds to the signal A0 to generate the signal $\overline{\text{Ref Req}}$. This signal is applied to the memory cycle control 30 which then cycles the integrated circuit memory 40 through a cycle similar to the Read cycle described above. There are however a couple of differences between the refresh cycle and the read cycle. During the refresh cycle the memory cycle control does not generate the signal Strobe in order to enter a data bit into the data output register. Also, the address used during the refresh cycle is contained in the counter 34. The address register 32 is not used during the refresh cycle. The signal Refresh is at a high level during the refresh cycle so that the output of gate 58 blocks the gates 54 and 56. At the same time, the signal Refresh conditions five gates 72 so the count in the address counter 34 is gated through gates 72 and NOR circuits 58 to the X address decoder 42. The X address decoder decodes the address and selects one of the 32 read output lines. The energized read output line controls one row of 32 memory cells in the array 48 so that the contents of these cells are read out to the 32 refresh amplifiers 46. The outputs of the refresh amplifiers are connected back to the same row of memory cells so that the data is returned to these cells with the charge being restored to some predetermined minimum level. At the end of the refresh cycle the memory cycle control generates the signal UP to increment the count in the refresh address counter 34. Thus, it takes 32 refresh cycles to insure that all 32 horizontal rows of memory cells have been refreshed.

Prior to the present invention it has been necessary to interrput normal usage of the memory at least every 2 milliseconds in order to refresh all of the memory cells. During this interruption the refresh counter was cycled through its 32 states during 32 consecutive memory cycles to refresh the cells in array 48 on a row by row basis. In accordance with the present invention, the cells in array 49 are still refreshed on a row by row basis but, by providing two memory modules and refresh interlace control means for sensing which module is performing a read or write cycle, it is possible to refresh one row of cells in the module that is not executing the read or write cycle, the refreshing taking place synchronously with the read or write cycle so no useful work time is lost. The circuit which controls the modules in this manner will now be described.

REFRESH INTERLACE CONTROL — FIG. 3

The odd refresh interlace control circuit 12 is shown in detail in FIG. 3. It will be understood however that the even refresh interlace control circuit 12' is identical with FIG. 3 except for the fact that the even refresh interlace control receives the complement of A0 on a lead corresponding to lead 18. The refresh interlace control circuit includes a Read/Write FF 82, a Data Tranfer FF 84, a Refresh Request FF 86, and three pulse generators or one-shot multivibrators 88, 90 and 92. The flipflops 82, 84, and 86 may be of the type comprising a pair of NAND gates, each gate having its output cross coupled to the input of the other.

The command $\overline{\text{Read}}$ is applied over lead 14 to the set input of the R/W FF 82 and to one input of a gate 94. The command Write on 16 is applied to the reset input of the R/W FF and the other input of the gate 94. The output of gate 94 is connected through an inverter 96 to one input of a gate 98 and through a further inverter 100 to one input of a gate 102. The address signal A0 is applied to the second input of gate 102 and through an inverter 104 to the second input of the gate 98.

The output from gate 102 triggers the multivibrator 88. The $\overline{Q}$ output of this multivibrator is connected to the set input of the Refresh Request FF 86. The Q output of multivibrator 88 is connected through an inverter 105 to one input of a gate 106. The output of gate 106 triggers the timer one-shot multivibrator 90. The Q output of multivibrator 90 is connected through an inverter 108 and a gate 110 to the one-shot multivibrator 92. The $\overline{Q}$ output of multivibrator 92 is connected back to the set input of the Refresh Request FF 86 and is also connected through a delay circuit 112 to a second input of the gate 106.

Remembering that FIG. 3 represents the odd refresh interlace control 12, and assuming that a Read operation is to be performed at a odd address, the circuit functions as follows. Low order address bit A0 is applied to the lead 18. For an odd address the low order bit A0 is at a low level and blocks the gate 102 thereby preventing triggering of the refresh one shot 88. The low level signal A0 is inverted at 104 and conditions one input of gate 98. Next, the low level command $\overline{\text{Read}}$ is applied on lead 14 from some external source and this signal sets the R/W FF 82 so that the flipflop generates the high level signal RC. This signal is applied to the memory cycle control of FIG. 2 so that the cycle about to be initiated will be a Read cycle.

The low level signal $\overline{\text{Read}}$ passes through gate 94 and amplifier 96 and conditions a second input of gate 98. Gate 98 produces the low level signal $\overline{\text{Cycle Init}}$ which is applied to the memory cycle control of the odd memory module to initiate a Read cycle of this module.

The output signal from gate 98 sets the Data Transfer FF 84 and it produces the signal Data En which is applied to gate 28 of FIG. 1. At the conclusion of the Read cycle the odd memory cycle control 30 produces the signal $\overline{\text{CC}}$ which resets the Data Transfer FF 84.

The operation of the circuit of FIG. 3 for a Write operation at an odd address is similar to that for a Read operation. The only difference is that the command $\overline{\text{Write}}$ on lead 16 drops to a low level thus resetting the R/W FF 82 and generating the signal $\overline{\text{WC}}$ which is applied to the memory cycle control of the odd memory module. The low level signal on lead 16 also passes through gate 94 and amplifier 96 to condition the gate 98 to produce the signal $\overline{\text{Cycle Init}}$. As with the Read cycle, the signal on lead 18 is at a low level thus blocking the gate 102 and conditioning one input of the gate 98.

Assuming now that the circuit of FIG. 3 represents the odd interlace control circuit 12, and further assuming that either a Read or Write operation is to be performed at an even address, the circuit of FIG. 3 operates as follows. The address signal A0 on lead 18 is at a high level because the address is even. This signal conditions one input of gate 102, and is inverted at 104 to block the gate 98. This prevents the gate 98 from emitting the $\overline{\text{Cycle Init}}$ signal. Either a Read command on lead 14 or a Write command on lead 16 sets or resets the R/W FF 82 but this has no effect since no $\overline{\text{Cycle Init}}$ signal is generated. The low level signal on lead 14 or 16 passes through gate 94 and is inverted by amplifier 100 to condition the second input of 102. The gate triggers the multivibrator 88 so that a short low level pulse appears on lead 114 while a short high level pulse appears on lead 116. The signal on lead 114 sets the Refresh Request FF 86 and the flipflop produces the signal $\overline{\text{Ref Req}}$ which is applied to the memory cycle control 30 of the odd memory module. This initiates a refresh cycle of the odd memory as previously described. At the end of the refresh cycle, the odd memory module cycle control 30 produces the low level signal $\overline{\text{Ref End}}$ to reset the Refresh Request FF.

From the preceeding description it is evident that on each memory cycle the refreshing of the data stored in one memory module takes place synchronously with a Read or Write operation in the other module. As long as the random accessing of addresses is such that every storage location in each module is refreshed at least as often as its data retention interval, all refreshing takes place syncronously and no memory time is lost. However, if the sequence of addressing should be such that over an interval of time corresponding to the data retention interval divided by the number of rows of storage locations in a module, all of the addresses accessed are in one module, it is necessary to interrupt normal memory operation and asynchronously refresh the data stored in that module.

In each refresh interlace control circuit, the one-shot multivibrator 90 serves as a timer for timing the interval since the associated module was last refreshed. The multivibrator includes a circuit curcuit having a time constant somewhat less than one thirty-second of the data retention interval of the cells in the memory arrays 48. The timing circuit insures that the Refresh Request FF is set at least 32 times so as to initiate at least 32 refresh cycles during an interval somewhat less than the data retention interval (2ms) of the cells in the memory arrays.

The multivibrator 90 controls asynchronous refreshing of the memory as follows. Each time the multivibrator 88 returns to its initial state after having set the Refresh Request FF 86, the low level signal on lead 116 is inverted by amplifier 105 and conditions one input of gate 106. The second input to gate 106 is obtained through delay circuit 112 from the multivibrator 92 and this signal is positive. The gate 106 triggers the multivibrator 90. However, because of the presence of the internal timing circuit the signal on lead 118 does not immediately drop to the low level but instead remains at the high level until the timing circuit has been charged. Furthermore, if the output of gate 106 should rise to the high level before the timing circuit is charged, the timing circuit is reset. That is, the timing circuit is reset each time the multivibrator 88 is triggered to request a new refresh cycle.

If the memory module is refreshed before the timing circuit is charged, the timing circuit is reset. When the multivibrator 88 produces an output signal on lead 114 to synchronously refresh the memory, the high level signal on lead 116 is inverted by inverted 105 and blocks gate 106. The output rises to the high level thus resetting the timing circuit in the multivibrator 90. At the end of the cycle of multivibrator 88, the signal on lead 116 drops to the low level thus causing gate 106 to apply a low going signal to multivibrator 90. This again initiates the charging of the timing circuit in the multivibrator.

The cycle of operation just described is continuously repeated and the signal on lead 118 remains at a high level provided that at least once during an interval of time corresponding to the timing constant of the circuit in multivibrator 90, the even memory module is accessed while multivibrator 88 is triggered to synchronously refresh the odd memory module. On the other hand, if the odd memory module is accessed every cycle over an interval of time corresponding to the timing constant of the circuit in multivibrator 90, the output 116 of multivibrator 88 in the odd memory module interlace controls remains at a low level, and, because the input to multivibrator 90 remains at a low level, the signal on output lead 118 drops to the low level. The low level signal on lead 118 is inverted by inverter 108 and applied through gate 110 to the multivibrator 92. This triggers the multivibrator 92 which, like multivibrator 88 produces a low level signal of predetermined duration on lead 120 to set the Refresh Request FF 86. The flipflop then produces the signal Ref Req to initiate an asynchronous refresh cycle of the odd memory module. This refresh cycle is executed in the same manner as the synchronous refresh cycles previously described and at the end of the cycle the memory cycle control circuit 30 produces the signal Ref End to reset the Refresh Request FF 86.

When the signal on lead 120 drops to the low level, it discharges the capacitor 122 in the RC circuit 112. This causes the signal on lead 124 to drop to the low level and gate 106 applies a high level signal to the multivibrator 90 to thereby reset it. After a short interval of time, the multivibrator 92 returns to its initial state and the signal on lead 120 rises to the high level. After a short delay, capacitor 122 is charged and a high level signal appears on lead 124 at one input of the gate 106. The gate 106 is thus conditioned so that on future cycles an output from the multivibrator 88 may be passed through the gate to retrigger the multivibrator 90.

Since the Ref Req signal appearing as a result of an output signal from multivibrator 90 occurs asynchronously with respect to memory cycles, the memory cycle control circuits 30 may be sequencing a Read or Write cycle at the time the Ref Req signal is generated. Thus, it will be understood that the memory cycle control 30 includes conventional interlock or priority circuits for locking out the Ref Req until the Read or Write cycle in progress is completed. The refresh request is then executed by memory cycle control 30 to refresh one horizontal row of 32 storage locations in the memory array 48, and the signal Ref End resets FF 86.

Because an asynchronous refresh request may not be executed immediately, and because a safety factor must be allowed for the time required to set up a refresh cycle, it will be understood that the timing constant of the timing circuit in multivibrator 90 must be less than one thirty-second of the interval at which the data signal stored in a module must be refreshed. Thus, the timing constant of this circuit may vary considerably depending upon the refresh requirements of the particular memory being used. Furthermore, since each refresh cycle refreshes only one horizontal row of cells in the memory, the timing constant will vary depending upon the number of horizontal rows in array 48. For example, if the memory array 48 had 20 horizontal rows, the counter 34 would be a modulo −20 counter and the timing constant of the timing circuit in multivibrator 90 would be less than one twentieth of the data retention interval of the cells in array 48.

SUMMARY

In summary, the present invention provides two refresh interlace control circuits each responsive to the same Read or Write command and address signal for controlling two storage devices. One storage device performs a Read or Write operation at a specified address while the other storage device performs a refresh operation at a plurality of storage locations as determined by the content of a counter. This arrangement permits the process of refreshing to occur simultaneously with the process of carrying out a Read or Write cycle thereby increasing the time the memory is available for useful work. If the situation should arise that one storage device is directed to perform every Read or Write cycle over an interval of time, its interlace control circuit recognizes the fact that normal addressing must be suspended so that at least a portion of the memory may be refreshed.

While a preferred embodiment of the invention has been described wherein the low order address bit A0 is utilized to determine the memory module containing the addressed data storage location, it will be obvious that other signals might be employed for the same purpose. For example, with two modules, as shown, each containing 1024 addressable locations, the high order bit of the address may be employed instead of the low order bit. Furthermore, the invention is not limited to a memory system employing only two modules. For example, in a system employing four modules each with 1024 addressable storage locations, the two high order bits may be decoded by a decoder associated with each of the four interlace control circuits. In this case one of the decoders will apply a low level signal to its interlace control circuit which the other three decoders apply high level signals to their interlace control circuit.

While, for the sake of clarity, the present invention has been described in connection with bit addressable memory arrays, it will be understood that the invention is equally applicable or suitable for use with word addressable memories wherein a plurality of integrated circuit chips 40 are addressed or accessed in parallel, the number of chips connected in parallel being equal to the word length. Other modifications and substitutions may be made in the disclosed embodiment without departing from the spirit and scope of the invention as defined in the appended claims.

The embodiments of the invention in which an exclusive property or privilege is claimed are defined as follows:

1. A memory system comprising:

first and second memory modules each having a plurality of addressable storage locations for dynamically storing data signals as trapped charges, said charges requiring refreshing at intervals of time, means for applying addressing signals to each of said memory modules;

first and second memory cycle control means for sequencing said first and second memory modules, respectively, through a read or write cycle in response to a cycle initiate signal or through a refresh cycle in response to a refresh request signal;

first and second interlace control circuits for producing said refresh request signals and said cycle initiate signals;

means for applying to each of said interlace control circuits an address signal indicating which memory module contains the storage locations being addressed; and, means for applying to each of said interlace control circuits a signal indicating whether a read or write operation is to be performed at the addressed storage location, said first interlace control circuit including, first means responsive said read and write operation signals and said address signal for producing and applying a refresh request signal to said first memory cycle control means when said address signal indicates the addressed storage location is not in said first memory module, and second means responsive to said read and write operation signals and said address signal for applying a cycle initiate signal to said first memory cycle control means when said address signal indicates the addressed storage location is in said first memory module;

said second interlace control circuit including, first means responsive to said read and write operation signals and said address signal for producing and applying a refresh request signal to said second memory cycle control means when said address signal indicates the addressed storage location is not in said second memory module, and second means responsive to said read and write operation signals and said address signal for applying a cycle initiate signal to said second memory cycle control means when said address signal indicates the addressed storage location is in said second memory module.

2. A memory system as claimed in claim 1 wherein means are provided for applying a read or a write signal to each of said memory cycle control means whereby the control means which has a cycle initiate signal applied thereto sequences its respective memory module through a read or a write cycle while the other memory cycle control means sequences its respective memory module through a refresh cycle.

3. A memory system as claimed in claim 2 wherein each memory module comprises an integrated circuit semiconductor memory.

4. A memory system as claimed in claim 2 wherein each of said interlace control circuits includes a third means responsive to said first means for asynchronously producing said refresh request signal if said first means does not produce a refresh request signal at least once during a fixed interval of time.

5. A memory system as claimed in claim 2 wherein each of said first means comprises a pulse generator having an output thereof connected to the input of a flipflop, and means for triggering said pulse generator in response to said read and write operation signals and said address signal to set said flipflop when said address signal indicates the addressed storage location is in the memory module associated with the interlace control circuit containing the other first means, the output from said flipflop being said refresh request signal.

6. A memory system as claimed in claim 5 wherein:

each said third means comprises a retriggerable one-shot multivibrator having a timing constant shorter than an interval defined the period at which said charges must be refreshed, divided by the number of refresh cycles required to refresh all storage locations in a module, and means connecting said pulse generator to said multivibrator whereby said multivibrator is retriggered to start measuring a new timing interval each time the pulse generator causes said flipflop to produce said refresh request signal.

7. A memory system as claimed in claim 6 and further comprising:

a further pulse generator responsive to said multivibrator for setting said flipflop each time the multivibrator is not retriggered during an interval of time exceeding the timing constant of the multivibrator.

8. In a dynamic memory system of the type requiring refreshing of stored data at least once during a given interval of time, the combination comprising:

a plurality of memory modules each storing data at a plurality of addressable memory locations;

a corresponding plurality of control means each associated with a corresponding one of said modules, for sequencing said modules through read, write, or refresh cycles;

means for applying addressing signals to said memory modules to address one of said memory locations;

means for applying read and write signals to all said control means; and, means for applying to all said control means an address signal indicating which memory module contains the addressed location;

said control means each including first means for sequencing a read or write cycle of its associated module if said address signal indicates the addressed memory location is in that module; and, said control means each including second means for sequencing a refresh cycle of its associated module if said address signal indicates the addressed memory location is not in that module.

9. The combination as claimed in claim 8 wherein said addressable storage locations are logically arranged in a matrix of rows and columns in each of said modules, said control means each including a refresh address counter for addressing said storage locations a row at a time, one row during each refresh cycle of the memory module, and said control means includes further means for initiating a refresh cycle of the associated memory module if said second means does not initiate a refresh cycle at least as often as said given interval of time divided by the number of rows of storage locations in the memory module.

10. The combination as claimed in claim 9 wherein said refresh address counter is a modulo N counter, N being the number of rows of storage locations in a memory module, said control means including means for incrementing said counter by one on each refresh cycle.

* * * * *

UNITED STATES PATENT OFFICE

CERTIFICATE OF CORRECTION

Patent No. 3,846,765 Dated November 5, 1974

Inventor(s) Robert Gale De Vries

It is certified that error appears in the above-identified patent and that said Letters Patent are hereby corrected as shown below:

On the Title Page, item [75], the inventor's name should read ---Hubert Gale DeVries---.

Signed and sealed this 29th day of April 1975.

(SEAL)
Attest:

RUTH C. MASON
Attesting Officer

C. MARSHALL DANN
Commissioner of Patents
and Trademarks